US008164460B2

United States Patent
Hedges et al.

(10) Patent No.: US 8,164,460 B2
(45) Date of Patent: Apr. 24, 2012

(54) METHOD AND APPARATUS FOR COUPLING MULTIPLE MICRORADIOS TO AN RFID TAG ANTENNA

(75) Inventors: Stephen A. Hedges, Nashua, NH (US); Kenneth R. Erikson, Henniker, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 532 days.

(21) Appl. No.: 11/919,047

(22) PCT Filed: Aug. 24, 2006

(86) PCT No.: PCT/US2006/033049
§ 371 (c)(1),
(2), (4) Date: Sep. 9, 2009

(87) PCT Pub. No.: WO2007/025025
PCT Pub. Date: Mar. 1, 2007

(65) Prior Publication Data
US 2009/0315676 A1     Dec. 24, 2009

Related U.S. Application Data

(60) Provisional application No. 60/711,325, filed on Aug. 25, 2005.

(51) Int. Cl.
*G08B 13/14* (2006.01)

(52) U.S. Cl. ............... 340/572.7; 340/572.4; 340/572.8; 340/10.1; 340/10.3; 235/492

(58) Field of Classification Search .............. 340/572.4, 340/572.5, 572.7, 572.8, 10.1, 10.3; 235/375, 235/376, 385, 487, 492
See application file for complete search history.

(56) References Cited

U.S. PATENT DOCUMENTS

| 7,986,236 B2 * | 7/2011 | Erikson | 340/572.1 |
| 2007/0085689 A1 | 4/2007 | Brommer et al. | |
| 2009/0128289 A1 * | 5/2009 | Rossman | 340/10.1 |

FOREIGN PATENT DOCUMENTS

| WO | WO2007/025060 A2 | 3/2007 |
| WO | WO2007/025061 A2 | 3/2007 |

* cited by examiner

*Primary Examiner* — Hung T. Nguyen
(74) *Attorney, Agent, or Firm* — Daniel J. Long; Robert K. Tendler

(57) ABSTRACT

Whether or not one utilizes direct DC coupling of the microradios to the antenna feed points or couples the RF energy from the dipoles associated with the spaced-apart contact pads on the microradio, in the subject invention one selects only those microradios that are within a certain variance of a preferred direction and then makes sure that the polarization direction of all of these radios is in the preferred direction are identical, in one embodiment by utilizing digital coding, which both activates the microradio and is used to sense the polarity associated with the connection from the signal source to the contact pads.

19 Claims, 5 Drawing Sheets

METHOD AND APPARATUS FOR COUPLING MULTIPLE MICRORADIOS TO AN RFID TAG ANTENNA

RELATED APPLICATIONS

This Application claims rights under 35 USC §119(e) from U.S. Application Ser. No. 60/711,325 filed Aug. 25, 2005 by Steve A. Hedges and Kenneth R. Erikson, the contents of which are incorporated herein by reference.

FIELD OF THE INVENTION

This invention relates to the use of Radio Frequency Identification (RFID) tags for tracking items during shipping, receiving the items at final destination and inventory control of items, and more specifically to methods for mounting multiple microscopic RFID microradio chips onto a larger antenna and programming them in such a way that they cooperate to provide maximum gain and so that the signal from one microradio chip will reinforce rather than cancel out that of another microradio chip.

BACKGROUND OF THE INVENTION

Presently in RFID tagging, there is interest in inexpensive item-level tags that require microradio chips, or microradios, coupled in some manner to an associated antenna. The reason for the utilization of these microradio chips and their associated antennas is that the major cost of the RFID tag is embodied in the integrated circuit chip. By making the RFID chips smaller, one can cost-effectively mass-produce them by fabricating millions of microradio chips on a single semiconductor wafer.

Conventionally, the problem with RFID chips is the cost associated with mounting and electrically connecting them to the feed point of the antenna so that RP energy may be effectively coupled from the antenna to the RFID chip and vice versa.

As described in U.S. Application Ser. No. 60/711,217 filed Aug. 25, 2005 by Kenneth R. Erickson, one of the ways to connect the RFID tag electronics to its associated antenna is to apply a multitude of microradio chips, suspended in a slurry, at the vicinity of the feed port of the antenna. In one approach to the coupling of the RFID electronics to the antenna, each microradio chip is provided with opposed electrically conductive end pieces or tabs, one of which is embedded in a conductive ink trace for one side of the antenna, whereas an opposing electrically conductive tab is embedded in an overlying patterned conductive trace for the other side of the antenna. In this way the RFID chips may be directly DC coupled to the antenna at its feed points.

Because of the large number of microradio chips contained in the slurry, it is indeed probable that at least one of them will be oriented appropriately so as to connect one of the conductive tabs to one portion of the antenna at its feed point and the tab at the other end of the microradio chip to the overlying conductive stripe that is connected to the portion of the antenna.

While it is recognized that direct DC coupling is a more robust way of coupling RF energy into and out of the microradio chip, it is also possible to provide a non-DC contact electromagnetic coupling between a collection of microradio chips in suspension within a slurry and the associated antenna feed points.

Regardless of whether the microradio chips have opposing conductive contacts, as required for the direct DC-couple case, or whether they couple electromagnetically, each will naturally exhibit a polarity. In the electromagnetic coupling case, the microradio chip will form an electric field dipole regardless of the antenna topology, be it a slot, a dipole, a patch, or a loop, employed in its design and construction. This electric field dipole, and hence the microradio chip, has a polarity depending upon which way the signal generator within the chip is connected to its internal antenna's feed port.

In both the direct DC-coupled and the electromagnetically-coupled cases, when many of these microradio chips are utilized to couple to a single RF tag antenna, there needs to be a method to ensure that they operate coherently, that is that their respective contributions add constructively rather than canceling each other out. The orientation, and hence the polarization, of microradios suspended within the slurry will tend to be random, statistically resulting in a significant degree of signal cancellation. In the direct DC-coupled case, for example, roughly half of the microradio chips contacting the tag antenna leads will have a polarization that opposes that of the other half.

It is important to be able to reverse the polarity of all of those suspended microradio chips that are oriented in one of these two polarization states so that all chips contributing to the RFID function electrically point in the same direction and so that their outputs add constructively.

Put another way, with the fluid suspension of the small electromagnetically-coupled microradio chips, each of these microradios has an associated electrical orientation because of the way it radiates through its electric dipole structure. Thus, when viewing the microradio chip, it is appropriate to say that one side of the chip has an electrical "north" and the opposite side has an electrical "south". When thousands of these microradio chips are suspended in a fluid and deposited in the vicinity of the feed port of the tag antenna, their north ends will tend to be in a random physical orientation relative to each other. Some will have their north ends closer to the upper tag antenna contact, while others will have their north ends closer to the lower tag antenna contact.

There therefore needs to be a way to first select the microradio chips whose north-south orientation is such that a significant portion of their radiating effects will contribute to the excitation of the tag antenna Secondly, there needs to be a way to selectively reverse the north-south polarization, so that when they radiate they will all radiate coherently with the other microradio chips in the suspension.

When these microradio chips are probed by an REID tag reader, all of them transmit simultaneously. If they are not oriented substantially parallel to each other, then it is possible that the radiation from one of the microradio chips would cancel out the other. Thus it is a requirement that one activate only those micro RFID devices that have a roughly similar physical orientation (i.e. north-south axis within say 30° of being perpendicular to the planes of the RF tag antenna leads) and among those, it is a requirement that the polarization direction be set so that all north axes align.

SUMMARY OF INVENTION

In order to permit coherent coupling of all of the microradios to the associated antenna feed in the subject invention, an electromagnetic signal is applied to the RP tag antenna so that all microradio chips suspended in the proper orientation (plus or minus some angle) within a slurry between the tag antenna's feed points are activated and configured for the proper polarity sense. The microradios that are outside a prescribed angular range are not activated and do not contribute the tag function. Thus when the suspended microradios function, only the activated chips will transmit because they are in a like orientation and polarization setting. This allows their transmissions to be constructively added to each other.

Since the integrated microradio chips discussed herein have a specific polarity relative to their physical structure, they form an electric dipole. This electric dipole is characterized by an orientation and a polarity sense. Two microradio chips that have the same (i.e. parallel) orientations may either have the same or the opposite polarity sense relative to each other....

It is the desideratum of the subject invention that one wants to single out all those devices that have their orientation approximately the same, for instance within plus or minus 30 degrees of vertical, and activate them to the exclusion of all other ones. In addition, it is the desideratum of the subject invention that all of the activated microradio chips that have one of the two polarity senses be programmed to reverse their polarity so that all activated chips end up with the same polarity sense. The result is that when the tag goes into operation, the transmissions of all microradio chips will add constructively.

As part of the subject invention, it is possible to transmit to each of these microradio chips a digital activation code to which each chip responds. If the chip is appropriately oriented and has the proper polarization direction, then the activation code is utilized to activate the particular microradio chip when this signal is transmitted from a programming stage.

However, if the microradio chip receives an inverted digital activation code, then it knows that it must reverse its connection to the internal dipole feed port so as to change a vertically down or south electrical polarization to a vertically up or north polarization, or vice versa.

While the direct DC-connection technique described in the aforementioned patent application can assure that the active microradio chips will be vertically oriented, it is nonetheless necessary to assure that the polarity sense of these vertical DC-coupled devices also be the same. After the RP tags are assembled (with the microradio slurry applied between the printed antenna tabs), they are subjected to a one-time programming operation that activates selected microradio chips and configures their polarity sense. DC-coupled microradio chips within the slurry that are not sufficiently oriented so that their conductive end-caps contact each tab of the tag antenna are never activated and remain functionally inert. Those microradio chips that are long enough to bridge the gap between the printed-on antenna traces have their polarity sense properly configured through the aforementioned digital programming.

Similarly, for those microradios that are designed to be electromagnetically coupled to the antenna feed points, those devices that are within a certain vertical angle range of the proper orientation and that share the same polarity sense, will add constructively during operation of the RF tag. Since the microradio chips are randomly oriented in the slurry, one must first select for activation only those devices that are properly oriented. This can be done in a programming step similar to that described for the direct DC-coupled microradio chips in which only those that are properly oriented will see enough of the electric field across the tag antenna pads that they can actually receive the activation signal.

Thus, in the subject invention one selectively activates the microradio chips that are roughly in the appropriate orientation so that one can apply an RF field to them, noting that only those devices that receive enough of the RF signal will be activated. This in essence selects which of the devices are to become active versus those to remain inactive. The second part of the process is to set the polarization direction of those that are active; and this is done by reversing the signal source connection to its internal dipole connection tabs so that one can selectively correct for a 180-degrees out-of-phase polarity sense.

Note, during the transmission of the polarization controlling signal, the power level of the programming source must be very carefully set such that off-axis devices, while they will still receive some signal, will receive a signal that is below their activation threshold.

As will be appreciated, in the programming process one step is the selective activation to select microradio chips with vertically-oriented electrical dipoles; and the other step is the polarity sense selection. The polarity sense selection is more important of the two operations because if one activates a device that is even 45 or 50 degrees off angle, this is permissible as long as it has the appropriate polarity sense direction. Thus, even if in operation that particular device transmits or receives, it will receive some of the signal and contribute to the constructive collaboration of the other microradio devices as long as it is operating in the appropriate up-down polarization.

In summary, whether or not one utilizes direct DC coupling of the microradio chips to the antenna feed points or couples the RF energy from the electrical dipoles associated with the electromagnetically-couple microradio chips, in the subject invention one selects only those microradio chips that are optimally oriented and polarized to enhance the collective operation. In one embodiment, polarity sense direction control is accomplished through a digital coded sequence so that individual microradio chips can differentiate from an inverted (180-degree out of phase) version of itself. Receipt of the inverted coded sequence instructs the microradio device to invert its internal connection to its respective internal dipole connection points.

BRIEF DESCRIPTION OF THE DRAWINGS

These and other features of the subject invention will be better understood in connection with the Detailed Description, in conjunction with the Drawings, of which.

DETAILED DESCRIPTION

By way of further background and prior to describing the operation of the subject invention to select microradio chip orientation and polarity direction, RFID tags have been utilized extensively to be able to trace pallets from a point of shipment through a destination, with the RFID tags being passive devices that are read-out with RF energy, usually in the 900 MHz range. These passive devices are parasitically powered by the energy impinging upon the antenna of the tag that is harvested by the integrated circuits within the tag, with the result that the tag transmits the identity of the pallet in response to a probing signal.

While such RFID tags are now mandated for pallets in some industries, there is increased level of interest in item-level tagging, which involves placing a tag on the item itself as opposed to on a pallet of items.

However, in order to be able to make such tagging strategies possible for low-value items such as toothpaste and the like, techniques are required to be able to manufacture and deposit the tags on items at an overall cost of no more than 5 cents per item.

Cost in general is dictated by the size of the integrated circuit chips involved. As to the size of the tags that are currently placed on pallets, they are on the order of 2 inches by 2 inches, with the antenna dimensions being the dominating factor. It is noted that the larger the antenna, the greater the range, since a larger tag antenna can capture more energy from a reader. For short-range applications such as monitoring pill bottle inventories, the antenna can be indeed quite small.

If one could make the integrated circuits very, very small, in the tens of micron size range, the cost per IC die goes down dramatically. This is because one can make millions of individual ICs per wafer. With processing costs constant and sufficient yields, one can reduce the cost of the tag under 5 cents.

Assuming that one can successfully separate the microscopic ICs from the host wafer, of particular importance in the provision of RFID tags are techniques to connect microradio integrated circuits to corresponding antennas with very little or no touch labor. While a co-pending application describes one method for coupling RFID circuits to an antenna at its feed point, there is a requirement for more efficient manufacturing methods and to obtain maximum gain and maximum output for the tag.

Figure 1:
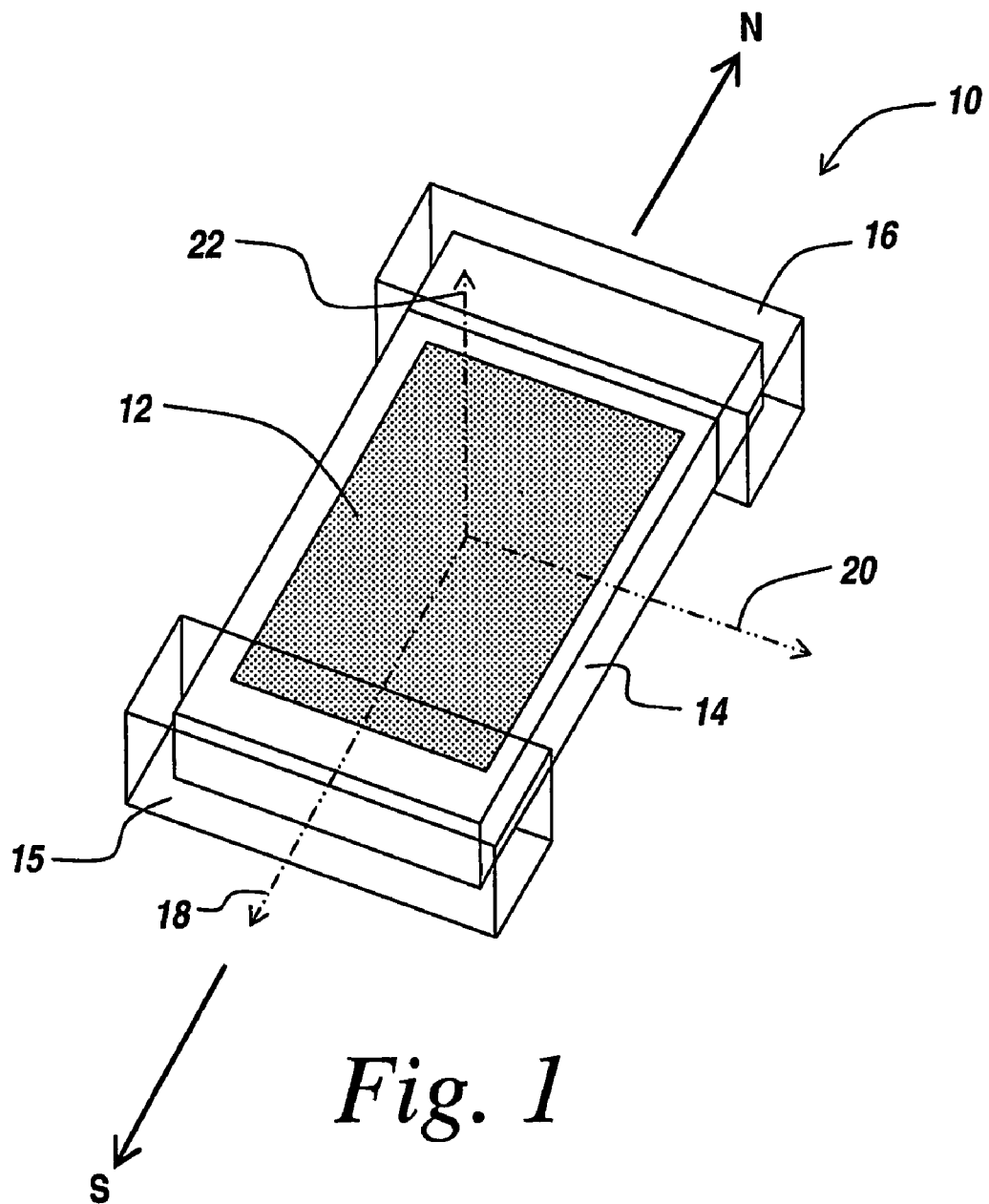
FIG. 1 is a diagrammatic illustration of an RFID tag integrated circuit or microradio chip, illustrating conductive end caps that form conductive tabs that establish the coupling of the microradio to its associated antenna.

Referring now to FIG. 1, a microradio chip 10 is manufactured as having an integrated circuit 12 located on a substrate 14, with the integrated circuit chip being connected to metallized ends 15 and 16 at opposite ends of the rectilinear chip structure. In one embodiment, the ratio of length to width is 2:1 to establish proper connection to spaced-apart antenna feed traces.

It is noted that there is a longitudinal axis 18 for such a microradio chip, and a lateral axis 20 as well as a vertical axis 22 as illustrated.

In a preferred embodiment, the chip has a 2:1 aspect ratio, with the metal ends manufactured as a modification of conventional chip manufacturing techniques. The chip can be mounted face up or facedown and achieve contact with the antenna for the tag. Alternatively, a chip can be mounted in a "capsule" fabricated using three-dimensional etch techniques. The capsule would then have large metal caps on the ends to provide the aforementioned pads or tabs.

In one embodiment, the microradio RFID chip is composed of several sublayers of integrated circuit materials and conductive materials, not shown in this figure. The insulating layer is normally applied over the chip area except for the metal pad regions. It is noted that the smaller the RFID chip that can be fabricated, the more chips that can be manufactured on a single wafer and lower the part cost for each chip.

It is noted that the structure in FIG. 1 is a three-dimensional contact structure in which the contact pads or tabs are not in a single XY plane but also have contact material in the Z direction with respect to the chip. As will be seen, the purpose of the three-dimensional contact structure when these microradio chips are deposited over an antenna feed is that they can make electrical contact to the antenna feed regardless of orientation of the microradio to the antenna feed. For instance, it is not necessary to have the microradio chip have its contacts or pads or tabs on a single plane, which must be married to the contact pads of the feed of the antenna.

Rather, the attachment of randomly oriented microradio chips can be established in accordance with the technique described in patent application entitled "RFID Tag and Method and Apparatus For Manufacturing Same," by Kenneth R. Erickson, assigned to the assignee hereof and incorporated herein by reference. In this patent application, randomly oriented microradios can be attached to an antenna feed by having one end of the microradio attached to one feed point, with an insulating layer placed on top of it followed by a conductive printed layer or trace to attach the other end of the microradio to the other feed point of the antenna. This technique is described in Provisional Patent Application Ser. No. 60/711,217 filed Aug. 25, 2005.

With such a rectilinear structure for the RFID chip, and as illustrated in FIG. 1, this type of structure having opposed contact pads or tabs results in a preferential polarization direction for the RFID chip.

In essence, the opposed metallic end caps 14 and 15 provide a dipole structure for the transmission of information to and from the RFID chip.

Figure 2:
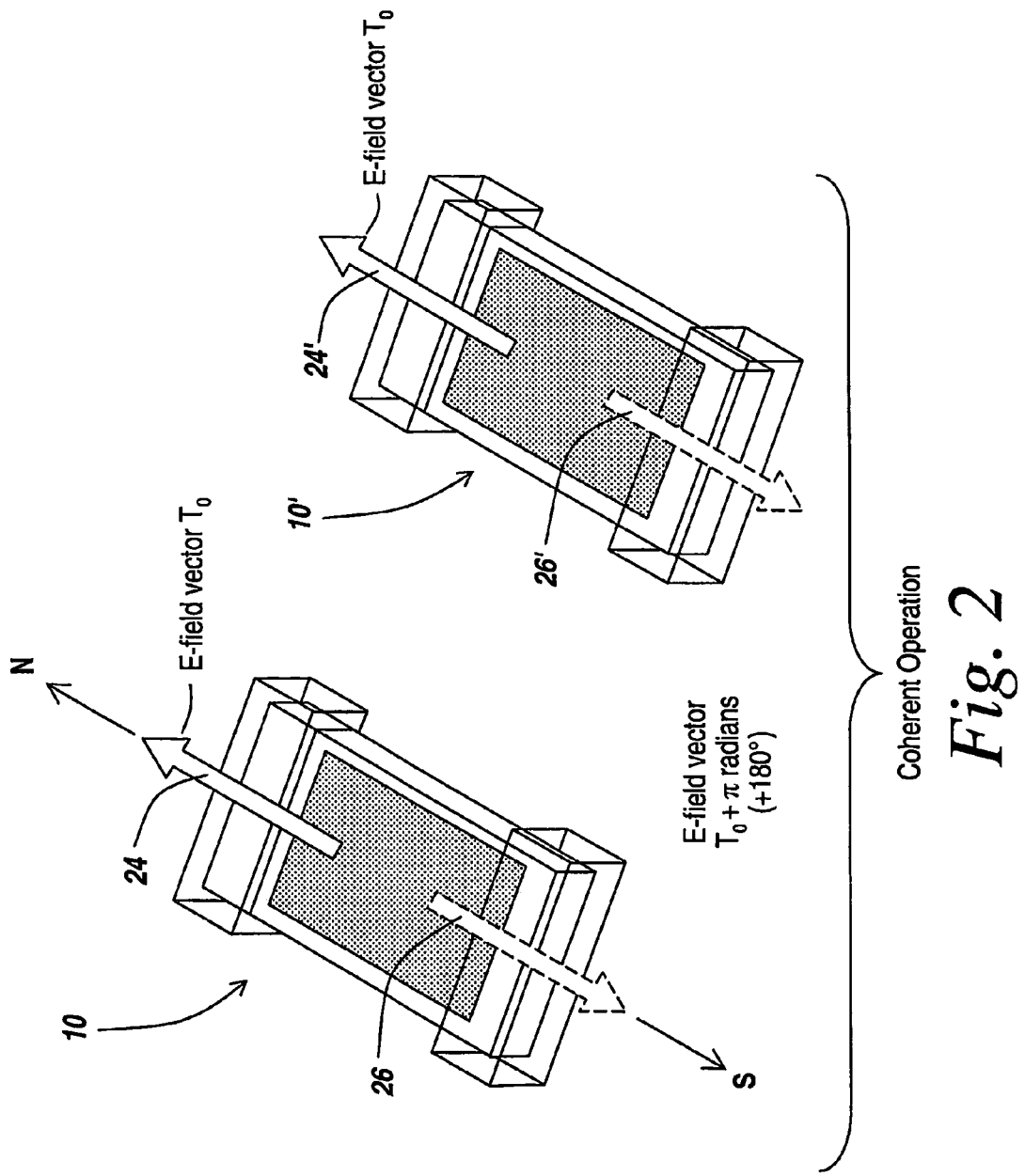
FIG. 2 is a diagrammatic illustration of the polarization direction of the microradio chip of FIG. 1, illustrating a north or up polarization associated with a particular E-field vector for one of the microradio chip, which is parallel to the E-field vector of an adjacent vertically oriented microradio chip. The result is parallel E-field vectors such that the outputs from the two microradio chips will coherently add.

Referring to FIG. 2, assuming that one has two chips, namely chip 10 and chip 10', located at the feed point of a tag antenna, then it is important that the polarization direction of these chips be aligned one with the other. To this end, chip 10 has an E-field vector at time $T_0$, here labeled by reference character 24, to be parallel to the E-field vector 24' of RFID chip 10'.

Thus at time $T_0$ the E-field vectors are parallel to each other and in the same direction.

As noted by the dotted vectors 26 and 26', these E-fields will exist at $T_0+\pi$ radians, with a change in the direction of the RF signal applied to the end tabs.

Due to the instantaneous E-field direction at time $T_0$ and the opposed field direction at time $T_0+\pi$ radians, the outputs of these two identically constructed microradios or RFID chips will add coherently.

Should, however, the chips be oriented such that one has a north orientation for its E-field vector and the other a south orientation, then it is quite clear that the energy from these chips will cancel each other.

Figure 3:
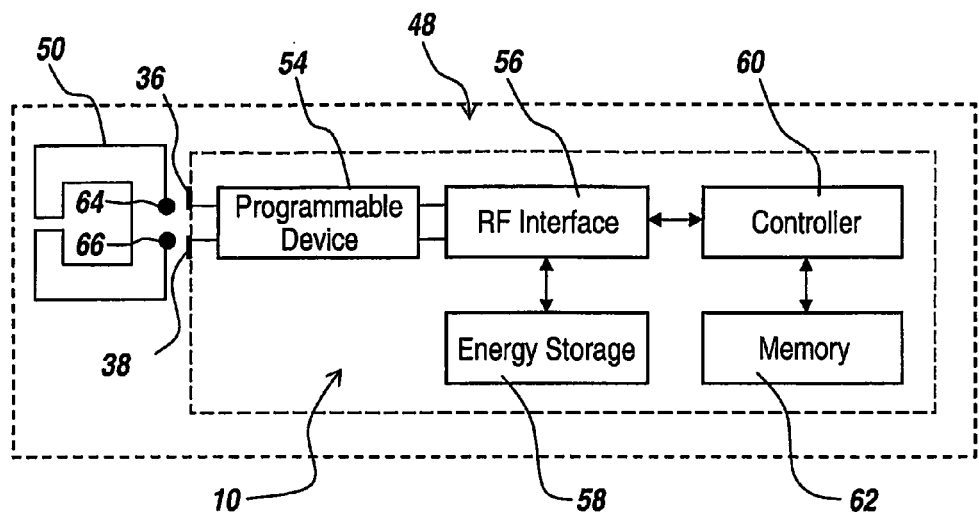
FIG. 3 is a block diagram of an electromagnetically-coupled microradio chip connected to its internal antenna through a programmable device that functions as an RF transfer switch, with this transfer switch providing a mechanism for reversing the polarity of the connection to the chip's internal antenna port upon receipt of an inverted digital coding sequence.

Prior to describing the coupling of the RFID chip microradio to an antenna, and referring now to FIG. 3, an RFID tag 48 includes inter alia an antenna 50 designed according to well-known principles. This antenna is responsive to RF energy in the chosen frequency band for the tag. As described below, this antenna is fabricated utilizing electrically conductive ink in one embodiment or any type of metallizing structure on an item to be tagged.

An integrated circuit microradio with conductive surfaces 36 and 38 contains a programmable device 54 together with an RF interface 56. Also included are an energy storage device 58, a controller 60 and a memory 62. The functions of the RF interface, energy storage, controller and memory are typical of passive RFID tags to provide the performance described hereinbefore.

Here it can be seen that it is important to be able to connect the REID chip 10 to antenna 50 by virtue of the direct DC contact of pads 36 and 38 to feed points 64 and 66 of antenna 50.

Figure 4:
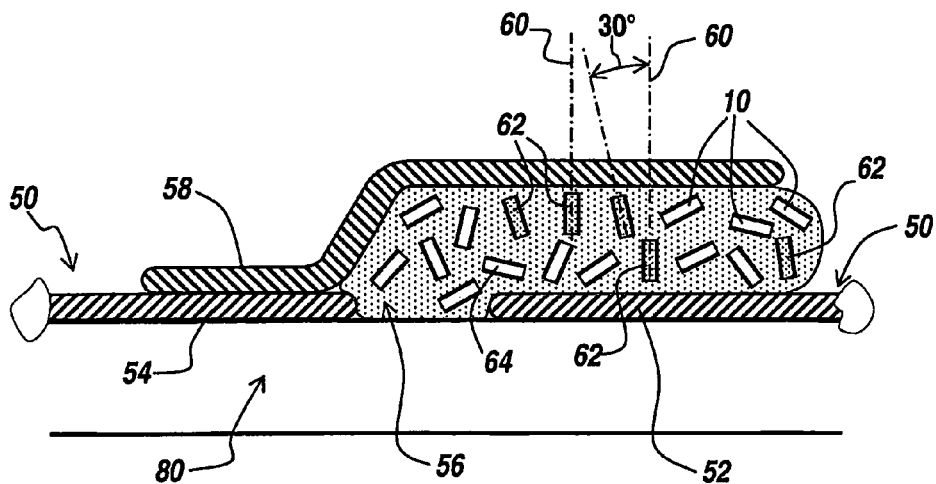
FIG. 4 is a diagrammatic illustration of the provision of a multiplicity of microradio chips suspended in a non-conductive slurry between opposing traces at the feed point of the tag antenna, indicating that some of the microradios in the slurry are oriented vertically with respect to the plane of the antenna.

Having described in the broadest terms the functional components of the microradio and its coupling to its associated antenna, and referring now to FIG. 4, microradios 10 can be electromagnetically coupled to the feed point of an antenna described by conductive traces 50 and 100 by providing a substrate 80 with a conductive trace 52 that connects to one side of the antenna and forms a feed point to the antenna, whereas a conductive trace 54 connects to the other side of the antenna at its feed point.

As illustrated, a non-conductive slurry 56 contains randomly oriented microradios 10 that are disposed in the slurry or fluid.

The conductive trace 54 is coupled to the microradios through an overlying conductive ink trace 58, which overlies the slurry containing the microradios such that RF energy from the microradios will be coupled to the feed point of the antenna 50 due to RF coupling techniques to be described.

The gain of the individual microradios may not be sufficient to enable coupling energy to and from the microradios to the antenna and vice versa. However, by providing a large number of microradios in the gap between traces 52 and 58, if coherent operation is achieved, one can increase overall output so that when added together there is sufficient signal strength.

There are two issues that must be addressed in order to obtain sufficient gain for this non-direct DC coupled embodiment and that is that one needs to be able to select microradios that have a predetermined orientation, in this case a vertical orientation as indicated by vertical dotted lines 60. It will be noted that the shaded microradios 62 are oriented such that they are, for instance, within 10 degrees of a vertical established as being perpendicular to the top surface of substrate 80 and the plane of the antenna feed traces.

The ability to select for activation only microradios having this vertical orientation or indeed any predetermined orientation is critical to the obtaining of the maximum amount of gain from the ensemble of microradios in the slurry.

In one embodiment this is simply accomplished by activating only those microradios having a vertical orientation, meaning that the programming power picked up by antenna 50 will only be of sufficient level to activate microradios in a predetermined orientation. Other radios that are located at orientations that are non-optimal will not receive enough of a signal from the programming step to cause the programming code to be received by the microradios. Assuming improper physical orientation, also the microradios may not be able to be parasitically powered. Thus if the orientation direction of the microradios is suboptimal such as, for instance, as illustrated by the orientation of microradio 64, it may not be able to be parasitically powered.

Figure 5:
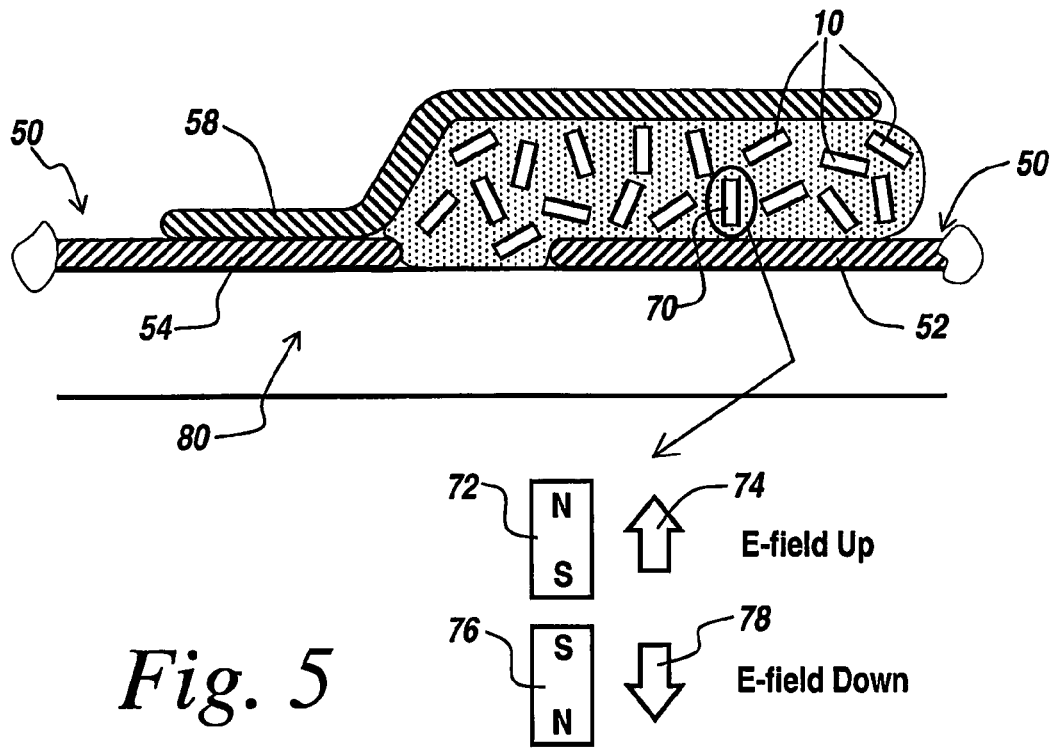
FIG. 5 is a diagrammatic illustration of one of the microradio chips in the slurry, which is vertically oriented but which may be polarized such that it either has an afield up orientation or an E-field down orientation depending upon the way in which the signal generator within the microradio chip is attached to its internal antenna dipole.

Referring to FIG. 5 and taking, for instance, microradio 70, which is vertically oriented with respect to traces 52 and 58, this microradio can have a polarization direction as illustrated at 72 such that north points up and south points down, with the E-field associated therewith oriented as illustrated at 74. Alternatively, the orientation can be as illustrated at 76, with the south pointing up and the E-field vector 78 pointed down.

As mentioned hereinbefore, if vertically oriented microradios in one embodiment have opposite polarization directions, then there will be phase cancellation of the outputs of these radios, which deleteriously affects the operation.

Figure 6A:
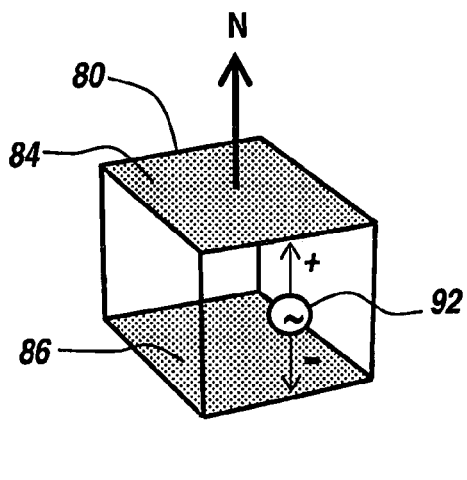
FIGS. 6A and 6B are diagrammatic illustrations of a microradio chip in the form of a miniature cube having a signal generator that drives the opposed end tabs out of phase, in which in FIG. 6A, the connection of the signal generator to the end tabs produces a north or up polarity sense while in FIG. 6B, the connection produces a down or south polarity sense direction.
Figure 6B:
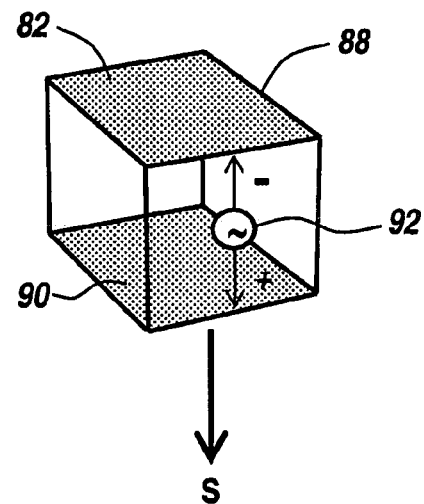

In short and referring to FIGS. 6A and 6B, if the microradios are envisaged as having a cubic structure as illustrated at 80 and 82, with opposed conductive tabs respectively 84 and 86 or 88 and 90. Then for a north-facing polarization orientation, a signal source 92 is connected as illustrated with the polarization likewise indicated.

Referring to FIG. 6B, if the connection from the signal source is reversed, then the polarization of the microradio will be in a southerly or down position.

Figure 7:
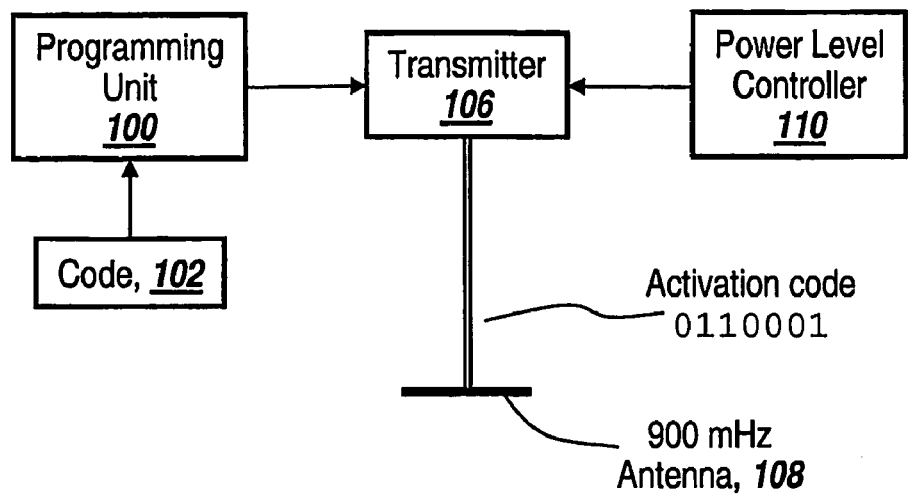
FIG. 7 is a diagrammatic illustration of the programming of a microradio chip utilizing a programming source that is provided with a code to which the chip is to respond, coupled to a transmitter and thence to an antenna that irradiates the chip with a programming code at a power level determined by a power level control circuit, with the detected code in the chip either detecting a predetermined digital code or its inverse; and, FIGS. 8A and 8B are diagrammatic illustrations of the changing of the coupling of a signal source to its associated end pieces based on whether a non-inverted or an inverted code is detected at the RFID chip of FIG. 6A or 6B.

Referring to FIG. 7, how one controls the connection of, for instance, vertically oriented microradios so that the connection from the signal source and the opposed end caps or tabs can be controlled, one has a programming unit 100 supplied with a code 102 that is to be detected by an RFID chip 104, both for activation and to control its polarization direction.

The output of the programming unit is coupled to a transmitter 106, in turn coupled to an antenna 108, with the power level of transmitter 106 being controlled by power level control 110.

In the illustrated embodiment, the code to which the RFID chip is to respond is a digital code 0110001.

In a programming step, upon receipt of this 0110001 code, chip 104 is activated. The chip will also respond to the inverse of this digital code, namely 1000110, likewise to activate the RFID chip.

If the chip receives the 0110001 code, the original polarity of the chip is preserved; whereas if the chip receives a 1000110 code, then switching circuits within the chip switch the signal source polarity so as to be opposite that which it originally had.

Figure 8A:
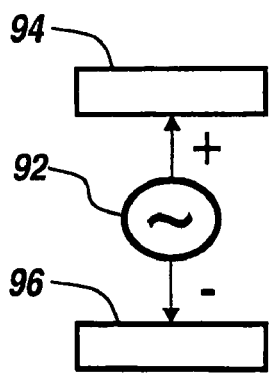
Figure 8B:
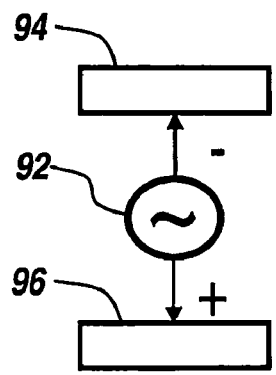

As shown in FIGS. 8A and 8B, signal source 92 in FIG. 8A is coupled to opposed tabs or end caps 94 and 96 as illustrated, whereas if a polarization reversal is required, then as illustrated in FIG. 8B, a signal source 92 is connected inversely to tabs 94 and 96 as illustrated.

Thus what can be seen is that through the programming step, one can select by the power level those RFID chips or microradios which are appropriately oriented in an optimal direction such that only these chips will be activated whereas the others will not be. Likewise and at the same time, utilizing the digital programming technique described, the polarization of the chip that has already been activated by virtue of its preferential orientation may be either left unchanged or inverted depending on whether or not the code received is the original code or the inverse code.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. In an RFID tag system in which multiple microradios are coupled to an antenna feed for an RFID tag, a method for assuring maximum signal strength from the microradios through the antenna to a reader, comprising the steps of:
depositing at least one microradio at the feed point of the antenna; and
activating the microradio only when its orientation is within a predetermined orientation relative to the antenna.

2. The method of claim 1, and further including the step of detecting which microradios have polarity vectors that are out of phase with the desired polarity vector and reconfiguring them to the correct polarization vector through a digitally-coded waveform applied to the RFID tag antenna.

3. The method of claim 1, wherein the microradio includes opposed conductive end pieces and further including the step of programming the microradios with signals from an RFID tag reader through the tag antenna in such a manner that only microradios having the predetermined orientation are activated.

4. The method of claim 3, wherein the microradios and the opposed conductive end pieces form a dipole when driven with an RF signal and wherein the microradio includes an RF signal source coupled to the end caps such that the end caps are driven out of phase.

5. The method of claim 2, wherein the detecting and reconfiguring step includes the step of programming at least one microradio from the reader with a digital signal, providing the microradio with a circuit for detecting the digital signal from the reader and reversing the connection of the signal source to the end caps in response to the detection of an inverted digital signal.

6. The method of claim 5, and further including the step of activating only that microradio that receives a digital activation code indicating proper orientation and polarization direction of the microradio.

7. The method of claim 6, and further including the step of refusing to activate a microradio that receives an inverted digital signal.

8. A method for selectively activating microradios having a random orientation at the feed point of an RFID tag antenna, comprising the step of:
activating a microradio only if its orientation is within a predetermined angle relative to a predetermined direction.

9. The method of claim 8, wherein the microradio has a polarization direction, and further including the step of activating the microradio only if the polarization direction of the microradio is in a predetermined polarization direction.

10. The method of claim 9, wherein the RFID tag antenna lies substantially in one plane and wherein the predetermined polarization direction is orthogonal to the plane of the antenna.

11. The method of claim 10, wherein the preferred orientation of the microradio is in a direction perpendicular to the plane of the antenna.

12. The method of claim 11, and further including the step of ascertaining the polarization direction of the microradio and changing the polarization direction of the microradio if the polarization direction of the microradio is opposite the predetermined polarization direction.

13. The method of claim 12, wherein the step of changing the polarization direction includes the step of providing the microradio with a signal source and two opposed end caps and changing the connection of the signal source to the end caps to change the polarization direction by 180 degrees.

14. In an RFID tag employing at least one microradio that functions as a dipole and has a signal source connected to two opposed end caps to establish a polarization direction, apparatus responsive to a predetermined coded signal for ascertaining the polarization direction of the microradio and for switching the connection of the signal source to the end caps to change the polarization direction of the microradio upon sensing an incorrect polarization direction represented by receipt of any inverted version of the predetermined coded signal.

15. The apparatus of claim 14, and further including a reader for projecting said predetermined digital code towards the antenna of the RFID tag, said code representing a predetermined polarization direction.

16. The apparatus of claim 15, wherein said RFID tag has an antenna and wherein at least one of said microradios is positioned across the feed of said antenna such that the orientation of said microradio is within a predetermined angle of a predetermined orientation.

17. The apparatus of claim 16, wherein said predetermined orientation and said predetermined polarization direction are parallel to one another.

18. The apparatus of claim 14, wherein the polarization direction of said microradio corresponds to the direction of an E-field vector associated with the microradio.

19. The apparatus of claim 14, wherein the polarization direction of said microradio is either up or down.

* * * * *